Dec. 9, 1958  H. M. McCONNELL ET AL  2,864,037
FAULT DETECTOR FOR POLYPHASE CIRCUITS
Filed Sept. 10, 1956
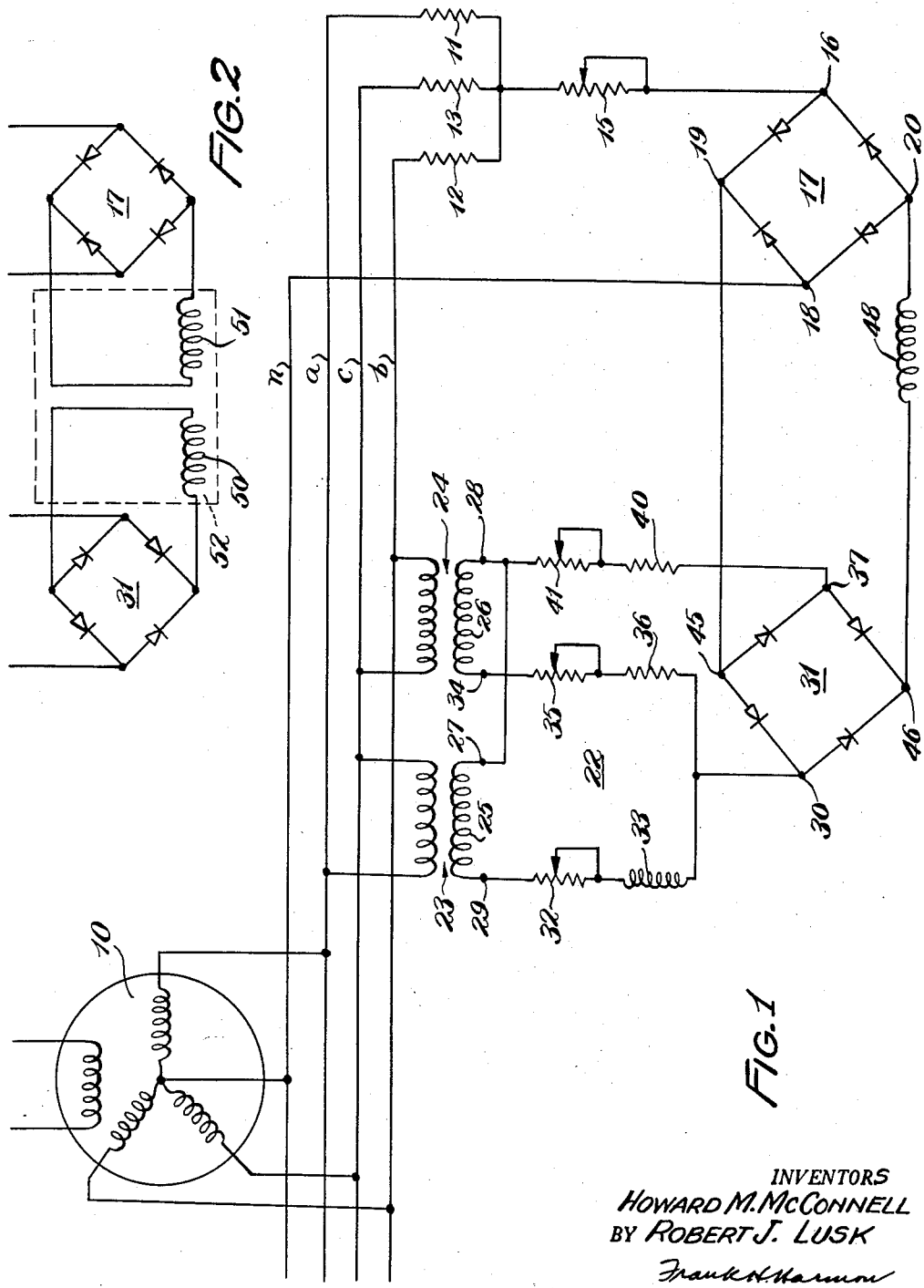
INVENTORS
HOWARD M. McCONNELL
BY ROBERT J. LUSK
ATTORNEY

United States Patent Office 2,864,037
Patented Dec. 9, 1958

2,864,037

FAULT DETECTOR FOR POLYPHASE CIRCUITS

Howard M. McConnell and Robert J. Lusk, Chagrin Falls, Ohio, assignors to Jack & Heintz, Inc., Cleveland, Ohio, a corporation of Delaware Application September 10, 1956, Serial No. 608,793

3 Claims. (Cl. 317—47)

The present invention relates to generating systems, particularly three phase generating systems, and more particularly to a method and apparatus for detecting faults, either line to line or line to neutral, in the three phase system.

The principal object of the present invention is to provide an apparatus for and method of detecting unbalance in a polyphase circuit, particularly asymmetrical voltages produced by short circuits and for disconnecting the generator for the polyphase system from the system upon the occurrence of a fault, the generator being protected independently of the type of fault which occurs.

Another object of the present invention is to provide an apparatus for measuring the symmetrical components of the phase voltages at the terminals of A. C. polyphase generators to determine whether or not a fault, either line to line or line to ground exists in the three-phase system and to perform a control operation in response to the occurrence of the fault.

A further object of the present invention is to provide an apparatus for measuring the symmetrical components of the line voltages of a three phase generator and to combine the symmetrical components in such a way that an output signal is provided which is proportional to the severity of a fault occurring in the three phase system regardless of the type of fault.

Yet another object of the present invention is to provide a method for detecting faults in a three phase distribution system which comprises measuring the symmetrical components of the voltages of the phases, combining the symmetrical components to obtain a control signal indicative of the severity of a fault, and performing a control operation in response to the signal.

Further objects and advantages of the present invention will be apparent from the following detailed description of the preferred embodiment made with reference to the accompanying drawing, in which:

Figure 1 is a schematic electrical diagram of a three phase electrical system including a fault detector constructed in accordance with the present invention, and Figure 2 is a schematic diagram of a modification of the signal responsive means used with the circuit of Figure 1.

It is known that when a polyphase A. C. generator is carrying an unbalanced or asymmetrical load, asymmetrical voltages develop at the terminals of the generator. These asymmetrical voltages may be resolved into component sets of different symmetrical voltages according to the theory of symmetrical component analysis. A three phase unbalanced system may be represented by symmetrical components which include a zero sequence component, a positive sequence component, and a negative sequence component. The meaning of these terms and derivation of the various components are well known to those skilled in the art and therefore will not be discussed in the present application.

A complete analysis of the system of symmetrical components and the derivations of the zero sequence component, the positive sequence component and the negative sequence component as applied to polyphase systems may be obtained by reference to "Symmetrical Component Analysis of Unsymmetrical Polyphase Systems," by R. Neumann, published in 1939 by Sir Isaac Pitman & Sons, Ltd., London, and to "Circuit Analysis of A.-C. Power Systems," volume I, by Edith Clarke, published in 1943 by John Wiley & Sons, Inc., New York. For the purpose of this application, suffice it to say that when the phase voltages are balanced, the zero sequence component and the negative sequence component disappear and only the positive sequence component remains. When a line to line fault, or short circuit, occurs a negative sequence system is produced at the generator terminals in addition to the positive sequence system normally present and when a line to ground fault occurs, both the negative sequence system and the zero sequence system occur in addition to the positive sequence system. The magnitude of the negative sequence system per unit of fault current differs in the case of each of the faults and is of larger magnitude when a line to line fault occurs.

The present invention contemplates measuring the negative sequence component preferably of the voltage, and the zero sequence component and adding the two with an appropriate sensitivity factor so that a signal is obtained whenever a fault occurs which is directly proportional to the severity of the fault regardless of the type of fault.

Any suitable circuit may be used to measure the negative and zero sequence components. The accompanying drawings show sequence segregating and measurement circuits for measuring the negative sequence component and zero sequence component. Also, any suitable method may be used to combine the two signals after rectification. For example, a relay or other control device with two control coils may be used. Another method, as shown in the accompanying drawings, makes use of two tandem bridge rectifiers.

Referring to the drawing, a generator 10 having star connected windings, is connected to a three phase distribution system having phases $a$, $b$ and $c$, and, in the illustrated system, a grounded neutral connection $n$. The zero sequence component of the voltages may be measured by using star connected resistors 11, 12, 13 to provide an artificial neutral, the voltage between the artificial neutral and the neutral conductor $n$ being a measure of the zero sequence component. The resistors 11, 12 and 13 have the same resistance and respectively have one side connected to phases $a$, $b$ and $c$ of the distribution system and their other sides connected to the neutral point of the star connection. The neutral point is connected through a variable resistance 15 to an input terminal 16 of a full wave rectifier bridge 17; the other input terminal 18 of the bridge 17, being connected to the neutral conductor $n$. The full wave rectified output of the rectifier bridge 17 appears at its output terminals 19, 20.

The negative sequence component of the phase voltages is measured by a network 22 including voltage transformers 23, 24 having secondary coils 25, 26, respectively. The primary coil of the voltage transformer 23 is connected across the phases $a$ and $c$ of the system, while the primary of the voltage transformer 24 is connected across the phases $c$ and $b$ of the system. The secondary, 25, 26, are connected so that if in-phase voltages were applied to their primaries, the secondary currents would oppose each other. One terminal 27 of the secondary coil 25 is connected to a terminal 28 of the secondary coil 26. The other terminal 29 of the secondary coil 25 is connected to an input terminal 30 of a full wave rectifier bridge 31 through a variable resistance 32 and a choke coil 33 connected in series. The other terminal 34 of the secondary coil 26 is also connected to the input terminal 30 of the rectifier bridge 31 but through a variable resistance 35 connected in series with a resistance 36. The other input terminal 37 of the rectifier bridge is connected to the terminal 28 of the transformer coil 26 through a resistor 40 connected in series with a variable resistance 41. The circuit elements between the transformer secondaries and the rectifier input terminals constitute a sequence segregation network.

In the circuit network 22 for measuring the negative sequence component, the impedance of resistor 32 and coil 33 is equal to the impedance of resistors 35, 36 with an angle of 240° between the phases to which they are connected. The variable resistance 41 is used to adjust the sensitivity of the negative sequence component measuring circuit.

The rectifier bridge 31 has output terminal 45, 46 which are connected with the output terminals 19, 20 of the rectifier bridge 17, so that the rectified output will flow in the same direction through the connections between the bridges. The connection between the terminal 46 of the bridge 31 and the terminal 20 of the bridge 17 includes a relay coil 48 which is responsive to the magnitude of current flow in the output circuit of the bridges. When the current reaches a magnitude indicative of a fault which would be detrimental to the system, the relay is actuated and a control function performed. In the case of a generator, the control function performed may be the disconnecting of the generator from the distribution system.

The variable resistances 15, 41 may be adjusted so that the total current flowing in the output circuit of the bridges 17, 31 is dependent upon the severity of fault regardless of the type. It can be seen that the relative output of the negative and zero sequence components of measuring circuit can be adjusted so that when a line to ground fault occurs, the magnitude of the output voltage of the zero component sensing circuit is such that it compensates for the change in magnitude of the negative sequence component which is less for a fault of the same severity when it is a line to ground fault than when it is a line to line fault, the line to line fault having no zero sequence component.

If desired the output of the rectifier bridges 17, 31 may be applied to respective control coils 50, 51 of a control device 52. The operation of the control device depends upon the resultant flux created by the currents flowing in the control coils.

It can be seen from the foregoing description that the present invention provides a new and improved fault sensing apparatus and a new and improved method of sensing faults which assures the detection of a detrimental fault regardless of whether it is a line to line fault or a line to ground fault and which provides an output signal dependent upon the severity of the fault and independent of the type of fault.

While the present invention has been described with reference to a three phase system, it will be understood by those skilled in the art that the system of symmetrical components may be applied to other polyphase systems in the manner similar to that described and that currents rather than voltages could be measured, and it is hereby our intention to cover such application and other modifications, constructions and arrangements which fall within the ability of those skilled in the art and the scope of the appended claims.

We claim:

1. In a three phase distribution system, a first sensing network for sensing the negative sequence component of the system voltage comprising a first voltage transformer having a primary connected across first and second phases of the system, a second voltage transformer having a primary connected across the second and third phases of the system, and a sequence segregation network connected to the transformer secondaries, a second sensing network for sensing the zero sequence component of the system voltage, a first rectifier bridge connected to the output of the sequence segregation network, a second rectifier bridge connected to the output of said second sensing network, said rectifier bridges being connected for additively combining the outputs of said networks, and means responsive to the combined output of said bridges for performing a control function.

2. In a three phase distribution system, a first sensing network for sensing the negative sequence component of the system voltage, comprising a first voltage transformer having a primary and a secondary, and having its primary connected across the first and second phases of the system, a second voltage transformer having a primary and a secondary, and having its primary connected across the second and third phases of the system, a sequence segregation network connected to the said secondaries of the first and second voltage transformers, a second sensing network for sensing the zero sequence component of the system voltage, a first rectifier bridge connected to the output of the said sequence segregating network and a second rectifier bridge connected to the output of said second sensing network and a control device having first and second coils connected to the output of said first and second rectifier bridges, respectively, said coils being connected to act additively.

3. In a three phase distribution system, a first sensing network for sensing the negative sequence component of the system voltage, a second sensing network for sensing the zero sequence component of the system voltage, a first rectifier, circuit means including a variable resistance for connecting the output of said first sensing network to said first rectifier, a second rectifier, circuit means including a variable resistance for connecting the output of said second sensing network to said second rectifier, and means responsive to the additively combined outputs of said rectifiers for performing a control function.

References Cited in the file of this patent
UNITED STATES PATENTS

| | | |
|---|---|---|
| 2,354,152 | Sonnermann | July 18, 1944 |
| 2,456,976 | McConnell | Dec. 21, 1948 |
| 2,516,025 | Sonnermann | July 18, 1950 |